(No Model.)  W. A. LORENZ.  3 Sheets—Sheet 1.
PAPER BAG.

No. 353,319.  Patented Nov. 30, 1886.

Witnesses:
William H. Honiss.
Henry T. Brück

Inventor:
William A. Lorenz (No Model.) 3 Sheets—Sheet 2.

W. A. LORENZ.
PAPER BAG.

No. 353,319. Patented Nov. 30, 1886.

Witnesses:
William H. Honiss.
Henry T. Brück

Inventor:
William A. Lorenz (No Model.) 3 Sheets—Sheet 3.
W. A. LORENZ.
PAPER BAG.
No. 353,319. Patented Nov. 30, 1886.
Fig.14  Fig.15  Fig.17  Fig.18
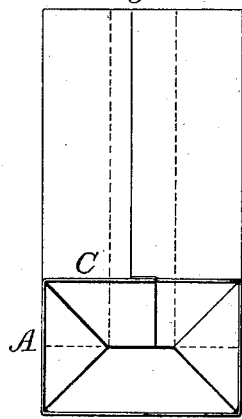 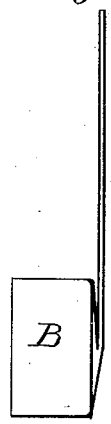 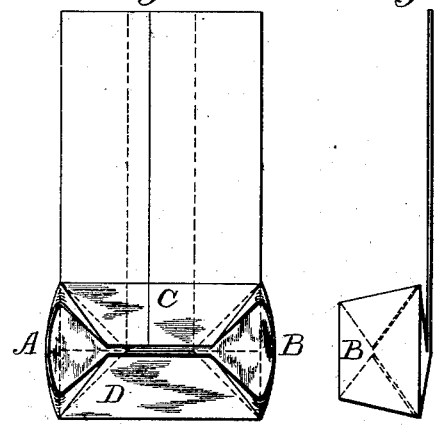 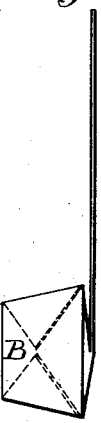
Fig.16  Fig.19
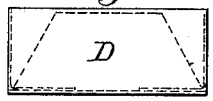 
Fig.20  Fig.22  Fig.23  Fig.24
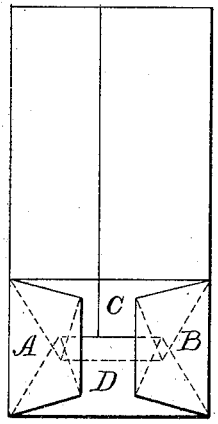 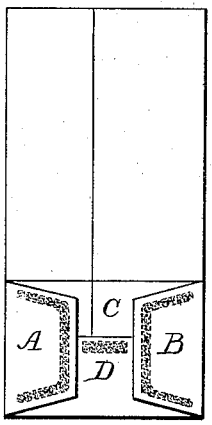 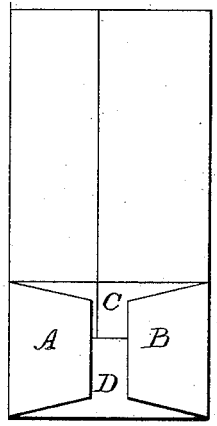 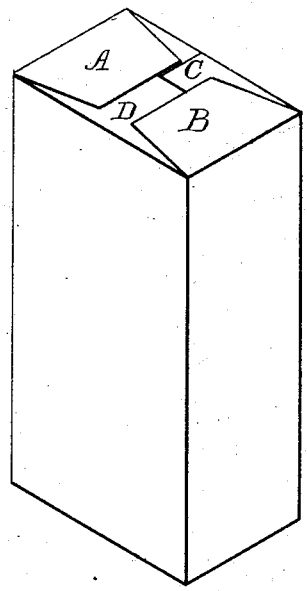
Fig.21
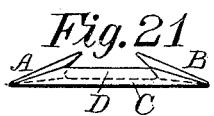
Fig.25
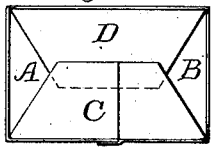
Witnesses:
William H. House
Henry T. Brück
Inventor:
William A. Lorenz

UNITED STATES PATENT OFFICE.

WILLIAM A. LORENZ, OF HARTFORD, CONNECTICUT, ASSIGNOR TO FELIX W. LEINBACH AND CLARENCE A. WOLLE, BOTH OF BETHLEHEM, PA.

PAPER BAG.

SPECIFICATION forming part of Letters Patent No. 353,319, dated November 30, 1886.

Application filed March 20, 1886. Serial No. 195,910. (No model.)

*To all whom it may concern:*

Be it known that I, WILLIAM A. LORENZ, of Hartford, Connecticut, have invented an Improvement in Paper Bags, of which the following description and claim constitute the specification, and which is illustrated by the accompanying three sheets of drawings.

This invention is a square-bottom paper bag with tucked sides and a peculiarly folded bottom.

Figure 1:
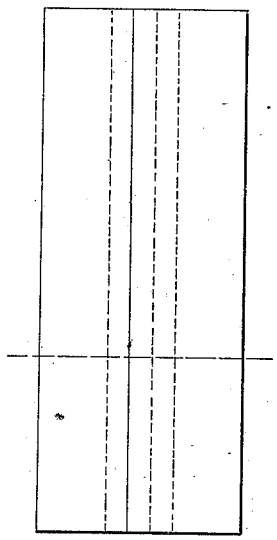
Figure 2:
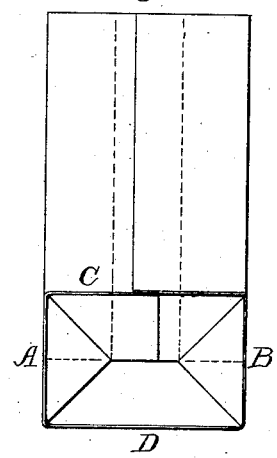
Figure 3:
Figure 4:
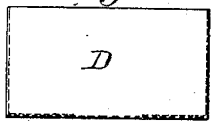
Figure 5:
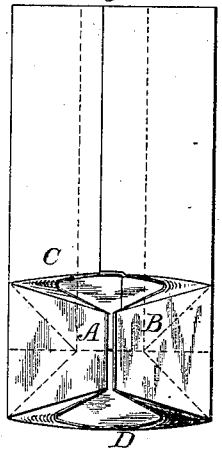
Figure 6:
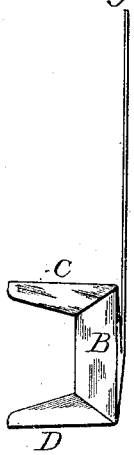
Figure 7:
Figure 8:
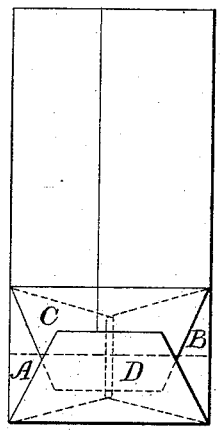
Figure 9:
Figure 10:
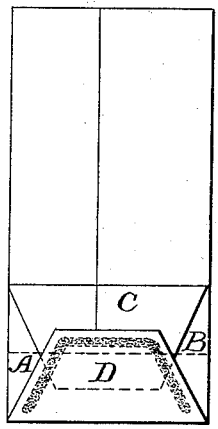
Figure 11:
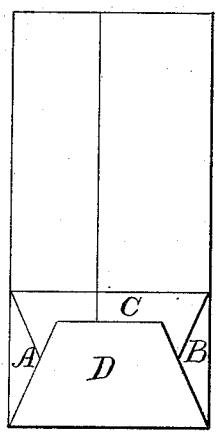
Figure 12:
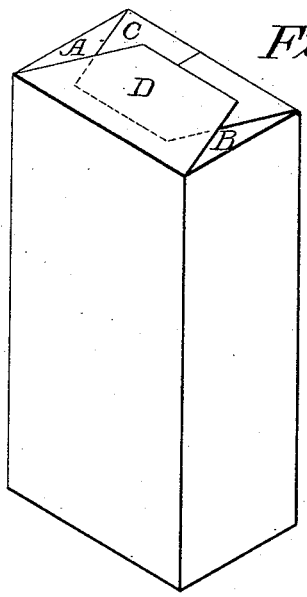
Figure 13:
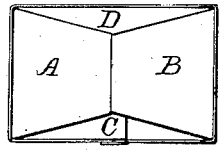

Figure 1 is a length of tucked paper tube, the outer longitudinal dotted lines thereof indicating the inward bends of the tucks in the tube. Fig. 2 is a view of the tube of Fig. 1 after its lower end has been opened out into a box-like form. Fig. 3 is a side view, and Fig. 4 is a view of the lower end of the blank of Fig. 2. Fig. 5 is a view of the blank of Figs. 2, 3, and 4 when the side walls of its box-like portion have been pressed somewhat toward each other. Fig. 6 is a side view, and Fig. 7 is a view of the lower end of the blank of Fig. 5. Fig. 8 is a view of the blank of Figs. 5, 6, and 7 when its side walls have been folded completely down, so that one of them laps somewhat over the other, and its upper wall has been folded down upon its side walls, and its lower wall has been folded down somewhat toward those which preceded it. Fig. 9 is a side view of the blank of Fig. 8. Fig. 10 is a view of the blank of Figs. 8 and 9 with paste applied to the surfaces under the partly-folded-down wall thereof. Fig. 11 is a view of the blank of Fig. 10 after the last-mentioned part has been folded down upon the pasted surfaces, and the bag has been thus completed. Fig. 12 is an isometric view of the bag of Fig. 11 opened out as in use, but with its bottom turned upward to show its appearance. Fig. 13 is a view of the bottom of the bag as seen by looking into the interior thereof. Fig. 14 is a view of a blank nearly identical with that of Fig. 2. Fig. 15 is a side view, and Fig. 16 is a view of the lower end of the blank of Fig. 14. Fig. 17 is a view of the blank of Figs. 14, 15, and 16 when the upper wall and the lower wall of its box-like portion have been pressed somewhat toward each other. Fig. 18 is a side view, and Fig. 19 is a view of the lower end of the blank of Fig. 17. Fig. 20 is a view of the blank of Figs. 17, 18, and 19 when its upper wall has been completely folded down, and its lower wall has been folded nearly down, and its side walls have been pressed somewhat toward each other. Fig. 21 is a view of the lower end of the blank of Fig. 20. Fig. 22 is a view of the blank of Fig. 20 with paste applied to the surfaces under the three partly-folded-down walls thereof. Fig. 23 is a view of the blank of Fig. 22 after said three walls have been pressed down upon the pasted surfaces, and the bag has been thus completed. Fig. 24 is an isometric view of the bag of Fig. 23 opened out as in use, but with its bottom turned upward for easy inspection. Fig. 25 is a view of the bottom of the bag as seen when looking into its interior.

A, B, C, and D are the four walls of the box-like form into which the lower end of the tube of Fig. 1 is opened up to make the blank of Figs. 2, 3, and 4, and the same letters designate the four walls of the box-like form of the blank of Figs. 14, 15, and 16, and designate also the flaps into which the four walls of the two blanks mentioned are folded down to make the bag.

The process of folding the bottom of the bag of Fig. 11 is as follows: The lower end of the tube of Fig. 1 is opened up into the box-like form shown in Figs. 2, 3, and 4. Then the walls A and B are pressed over toward each other by means of a flat implement pressed upon the outside of each, the outlines of each of those implements being coincident with the obtuse-angled dotted line shown in Fig. 3. That pressing carries the four walls to the position shown in Figs. 5, 6, and 7, and thence, without stopping, to a position wherein the walls A and B are pressed flat down upon the body of the blank, and the walls C and D are drawn toward each other, so that their upper edges are almost or quite in contact. Then the implements which pressed down the walls A and B are withdrawn, and the wall C is pressed by the hand or by any suitable implement down upon the upper surfaces of the walls A and B, as shown in Figs. 8 and 9. Then paste is applied to the upper surfaces of the walls A, B, and C, under the overhanging wall D, as shown in Fig. 10, and then the wall D is pressed down upon those surfaces, and the bag of Fig. 11 is thus completed.

The process of folding the bottom of the bag of Fig. 23 is as follows: The lower end of the tube of Fig. 1 is opened up into the box-like form of Figs. 14, 15, and 16. Then the walls C and D are pressed over toward each other by means of a flat implement pressed upon the outside of each, the outlines of each of those implements being coincident with the obtuse-angled dotted line shown in Fig. 16. That pressing carries the four walls to the positions shown in Figs. 17, 18, and 19, and thence, without stopping, to a position where the wall C is pressed flat down upon the body of the blank, and the wall D is pressed nearly down, and the walls A and B are drawn toward each other, as shown in Figs. 20 and 21. Then paste is applied to the upper surface of the wall C under the overhanging wall D, and then the latter wall is pressed down upon the same. Then the implements which pressed down the walls C and D are withdrawn, and paste is then applied to the upper surfaces of those walls under the overhanging walls A and B, as shown in Fig. 22, and then the walls A and B are pressed down upon those surfaces, and the bag of Fig. 23 is thus completed.

The central and most essential feature of the process of folding the bottom of either of the two described forms of this bag consists in pressing the first-folded walls over toward each other and down upon the body of the blank by means of two flat implements, each of which has an outline with two obtuse angles, as shown by the dotted lines in Figs. 3 and 16, respectively. Such implements not only fold down the walls upon which they are pressed, but they also draw the other pair of walls toward each other, and give them the outlines of a truncated triangle, the sides of which, if projected, would meet at an acute angle. This drawing of the last pair of walls toward each other by the same motions that fold down the first pair of walls is new, and is highly useful, in that it much facilitates the manufacture of paper bags. The described form of the last pair of walls enables the first pair to meet and to lap consistently with the inner thicknesses of the last pair coming considerably short of such meeting and lapping. These two results are both highly conducive to the strength and evenness of the bottom of the bag; but I believe they have never before both been attained when folding one end of an unslitted square-cut paper tube into a bag-bottom.

I claim as my invention—

A paper bag two opposite sides of which are inwardly tucked, and the bottom of which is composed of two opposite overlapping flaps and two opposite open-mouth flaps, all four of which flaps are turned toward the center of the bottom of the bag on a line extending around the bag on one plane, and all four of which flaps are everywhere of one length in the directions which extend at right angles from the respective reaches of that line, and each of which two overlapping flaps is composed of but one thickness of paper and is in the form of a truncated acute-angled triangle, and each of which open-mouth flaps is composed of an outer thickness of paper in the form of a truncated acute angled triangle, and of two inner thicknesses of paper, each of which serves to connect the outer thickness to one of the overlapping flaps, and is in the form of an acute-angled triangle, all substantially as described in the foregoing description, and elaborately illustrated in the accompanying three sheets of drawings.

February 19, 1886.

WILLIAM A. LORENZ.

Witnesses:
ALBERT H. WALKER,
WILLARD EDDY.